US011279211B2

(12) United States Patent
Koehler et al.

(10) Patent No.: US 11,279,211 B2
(45) Date of Patent: Mar. 22, 2022

(54) DOOR ASSEMBLY FOR A MOTOR VEHICLE

(71) Applicant: Ford Global Technologies, LLC, Dearborn, MI (US)

(72) Inventors: Juergen Koehler, Cologne (DE); Kai Erik Mueller-Wiedensee, Cologne (DE); Chris Curtis, Leverkusen (DE); Emrah Tokyuerek, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/163,707

(22) Filed: Feb. 1, 2021

(65) Prior Publication Data

US 2021/0237541 A1 Aug. 5, 2021

(30) Foreign Application Priority Data

Feb. 3, 2020 (DE) ........................ 102020102608.0

(51) Int. Cl.
*B60J 5/04* (2006.01)
*B60R 13/02* (2006.01)

(52) U.S. Cl.
CPC ........... *B60J 5/0455* (2013.01); *B60J 5/0413* (2013.01); *B60R 13/0243* (2013.01)

(58) Field of Classification Search
CPC ...................................................... B60J 5/0455
USPC ................................ 296/187.12, 153, 146.7
See application file for complete search history.

(56) References Cited

U.S. PATENT DOCUMENTS

| | | | | | |
|---|---|---|---|---|---|
| 5,603,548 | A * | 2/1997 | Gandhi | .................. | B60J 5/0452 296/146.7 |
| 6,170,902 | B1 | 1/2001 | Sakuma et al. | | |
| 6,688,671 | B2 * | 2/2004 | Fukutomi | .............. | B60J 5/0425 296/187.12 |
| 6,779,831 | B2 | 8/2004 | Moriyama | | |
| 6,955,391 | B1 | 10/2005 | Peng | | |
| 7,997,637 | B2 | 8/2011 | Suzuki et al. | | |
| 9,266,489 | B2 | 2/2016 | Smith et al. | | |
| 10,000,112 | B2 | 6/2018 | Patel et al. | | |
| 2007/0246925 | A1 | 10/2007 | Mani | | |

FOREIGN PATENT DOCUMENTS

| | | | |
|---|---|---|---|
| DE | 102005039813 | A1 | 3/2007 |
| GB | 2238989 | A | 6/1991 |
| WO | 2019068984 | A1 | 4/2019 |

* cited by examiner

*Primary Examiner* — Joseph D. Pape
(74) *Attorney, Agent, or Firm* — Vichit Chea; Price Heneveld LLP

(57) ABSTRACT

A door assembly for a motor vehicle is provided having a door body and a door trim panel attached to the door body on the vehicle inside, with a first impact region and a second impact region formed integrally therewith, wherein at each of the impact regions, an intermediate space is formed between the door trim panel and the door body. In order to allow an optimized protection of an occupant's pelvic region from impact by a vehicle door in a side impact, it is provided that a nominal break line is formed between the first impact region and the second impact region, along which the first impact region or seat impact region can be separated from the second impact region by a force acting in the vehicle transverse direction.

19 Claims, 6 Drawing Sheets

DOOR ASSEMBLY FOR A MOTOR VEHICLE

CROSS-REFERENCE TO RELATED APPLICATION

This application claims foreign priority benefits under 35 U.S.C. § 119(a)-(d) to German Application No. 102020102608.0 filed Feb. 3, 2020, which is hereby incorporated by reference in its entirety.

FIELD OF THE DISCLOSURE

The present disclosure generally relates to motor vehicle doors, and more particularly relates to a door assembly for a motor vehicle having impact regions.

BACKGROUND OF THE DISCLOSURE

A typical structure of a vehicle door has an outer panel and an inner panel which substantially define the outer form and mechanical stability of the door. These panels in assembled state are known as the "door carcass." On the inside of the inner panel, normally a door module is commonly arranged which may serve to cover openings in the inner panel and hold functional elements such as electric window lifters, speakers, locking elements etc. For aesthetic reasons amongst others, the door module is typically covered with a door trim panel on the sides facing the vehicle interior. The door trim panel may be attached to the inner panel or door module. This door trim panel is usually made of plastic, in some cases with a surface coating providing a pleasing appearance and feel, and may include one or more trim elements.

In a side impact, the door of a vehicle may be pushed in and thus collide with an occupant sitting on a vehicle seat. The collision firstly takes place with the door trim panel which forms the innermost part of the door. In a side impact, normally one and the same trim element may collide with the lower thorax and pelvis of the occupant, and with the vehicle seat. Part of the seat, such as a frame of the seat lower part or backrest or an adjustment lever, may protrude laterally towards the outside relative to the occupant's pelvis.

In a side impact, the door trim panel may be compressed by the seat components before the trim panel contacts the occupants. Although, viewed from the side, a first region of the trim element may contact with the seat component and a separate second region may contact with the occupant, because of the stiffness of the trim element not only is the first region compressed but also at the same time the second region. Thus, the second region may be precompressed and when it contacts the occupant, cannot be compressed or only slightly compressed further. This in particular may concern the occupant's pelvic region. To counter this situation, it may be possible to reinforce the first region by stiffening elements, e.g., ribs, in order to prevent premature compression. However, this necessarily also leads to a stiffening of the second region, which may adversely affect its crumple properties. Another possibility would be to make the two regions from separate trim elements with different stiffness, which however may lead to more complex mounting with respect to the precise mutual alignment of the two trim elements. Furthermore, active protection systems such as side airbags are known. These however lead to a significantly more complex structure. Usually, active systems also entail a higher weight or higher mass.

It would be desirable to provide for a door assembly that offers improvement in the protection of the occupant's pelvic region from contact by a vehicle door in a side impact in a fashion which is not structurally complex while also meeting system safety performance

SUMMARY OF THE DISCLOSURE

According to a first aspect of the present disclosure, a door assembly for a motor vehicle is provided. The door assembly includes a door body, and a door trim panel attached to the door body on a vehicle interior side, the door trim panel having a first impact region and a second impact region formed integrally therewith, wherein at each of the first and second impact regions, an intermediate space is formed between the door trim panel and the door body, wherein a nominal break line is formed between the first impact region and the second impact region, along which the first impact region can be separated from the second impact region by a force acting in a vehicle transverse direction.

According to a second aspect of the present disclosure, a door assembly for a motor vehicle is provided. The door assembly includes a door body, a door trim panel attached to the door body on a vehicle interior side, the door trim panel having a first impact region and a second impact region formed integrally therewith, wherein at each of the first and second impact regions, an intermediate space is formed between the door trim panel and the door body, wherein a nominal break line is formed between the first impact region and the second impact region, along which the first impact region can be separated from the second impact region by a force acting in a transverse direction, and at least one support element extending in the transverse direction between an edge region of the second impact region formed adjacent to the nominal break line and the door body, wherein an extent of the support element in the vehicle transverse direction corresponds to at least 70% of an extent of the intermediate space.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the different figures, identical parts are always provided with the same reference signs, for which reason these parts are generally also described only once.

Figure 1:
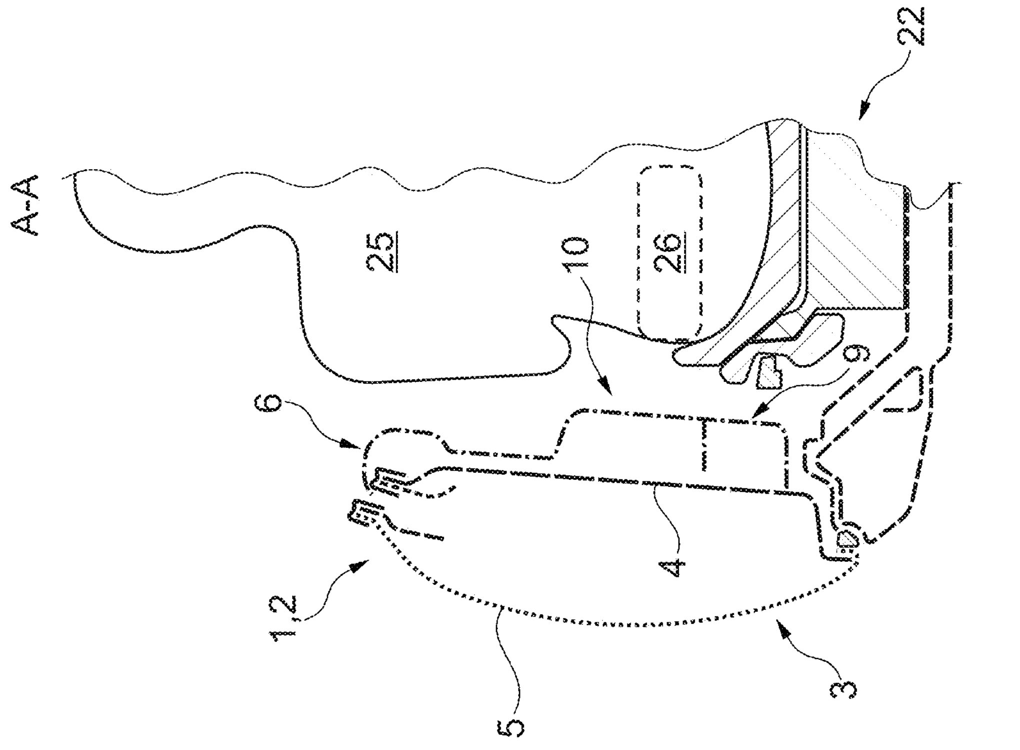
FIG. 1 is a sectional illustration of a front view of a vehicle with a door assembly and a seated occupant, taken along line A-A from FIG. 3C.

FIG. 1 shows a front view of a motor vehicle, such as a car with a door assembly 2 as part of a vehicle door 1, and with a vehicle seat 22 with an occupant 25 seated thereon, here depicted schematically as a dummy. Most components of the car have been omitted here for reasons of clarity. The vehicle door 1 has a door body 3 with an inner panel 4 and an outer panel 5. A door trim panel 6 is attached to the inner panel 4 on the inside. In one example, the door body 3 is made of sheet metal and the door trim panel 6 is made of plastic. Within the door trim panel 6, a first impact region 9 may be defined which is designated below as an example as the seat impact region 9. The seat impact region 9 lies opposite the vehicle seat 22 in the vehicle transverse direction (i.e., along the Y-axis), in particular opposite especially hard seat components, such as, for example, an adjustment lever or a seat frame.

In a side impact, the seat impact region 9 accordingly is designed to collide exclusively or mainly with the vehicle seat 22.

Furthermore, a second impact region 10 may be defined which is designated below as an example as the pelvic impact region 10. The pelvic impact region 10 lies opposite a pelvic region 26 of the occupant 25 in the vehicle transverse direction. Accordingly, in a side impact, the pelvic impact region 10 may collide mainly or exclusively with the pelvic region 26.

As evident from FIG. 1, in the vehicle transverse direction, in each of the impact regions 9, 10, an intermediate space is provided between the door trim panel 6 and the door body 3, or more precisely, the inner panel 4. Because of the intermediate space and the generally comparatively easy deformability of the plastic material from which the door trim panel 6 is made, each impact region 9, 10 can yield or be pushed in during a side impact. With respect to the pelvic impact region 10, this means that the maximum forces acting on the pelvic region 26 can be limited in order to prevent excessive impact to the occupant 25.

Figure 2:
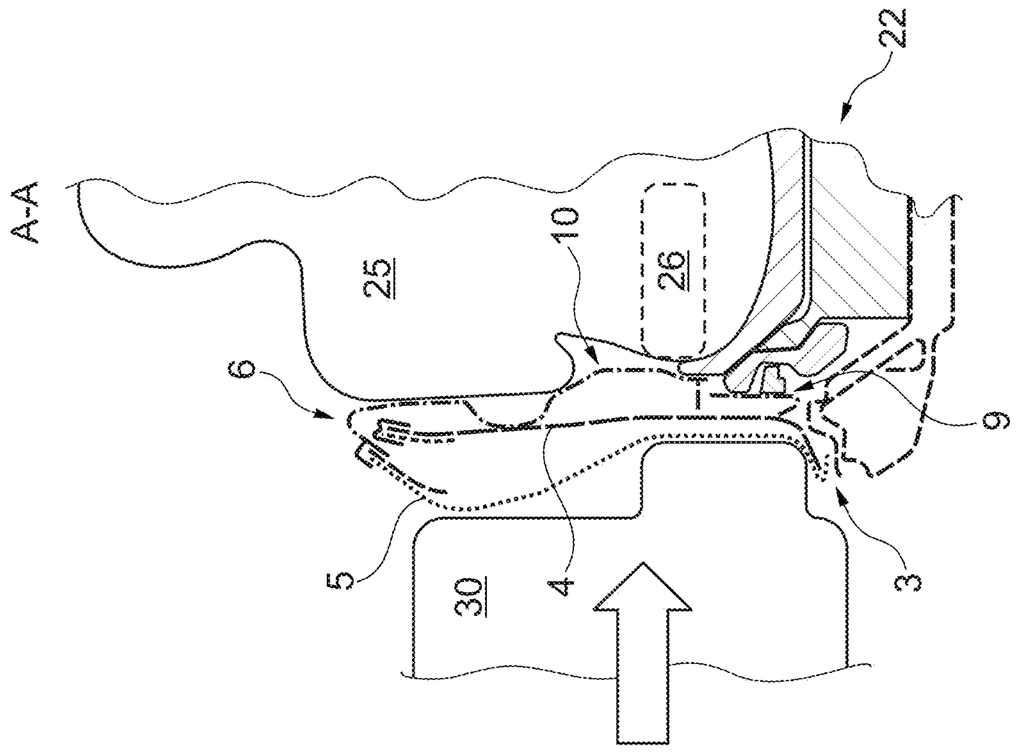
FIG. 2 is a sectional illustration of a front view of the vehicle with the door assembly from FIG. 1 in a side impact, taken along line A-A from FIG. 3C.
Figure 3A:
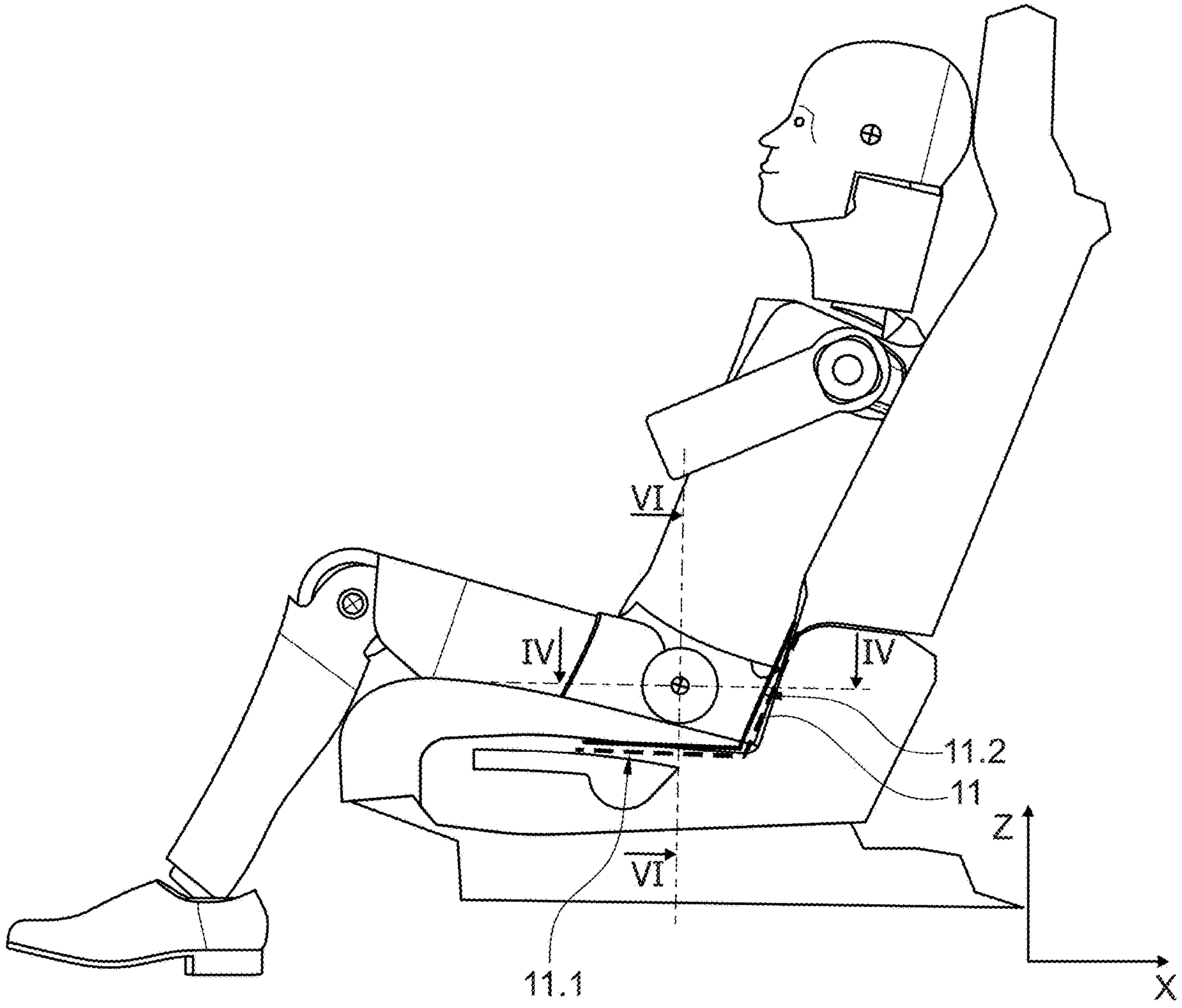
FIG. 3A is a side view of a vehicle seat with a stylized person (dummy) seated thereon.
Figure 3B:
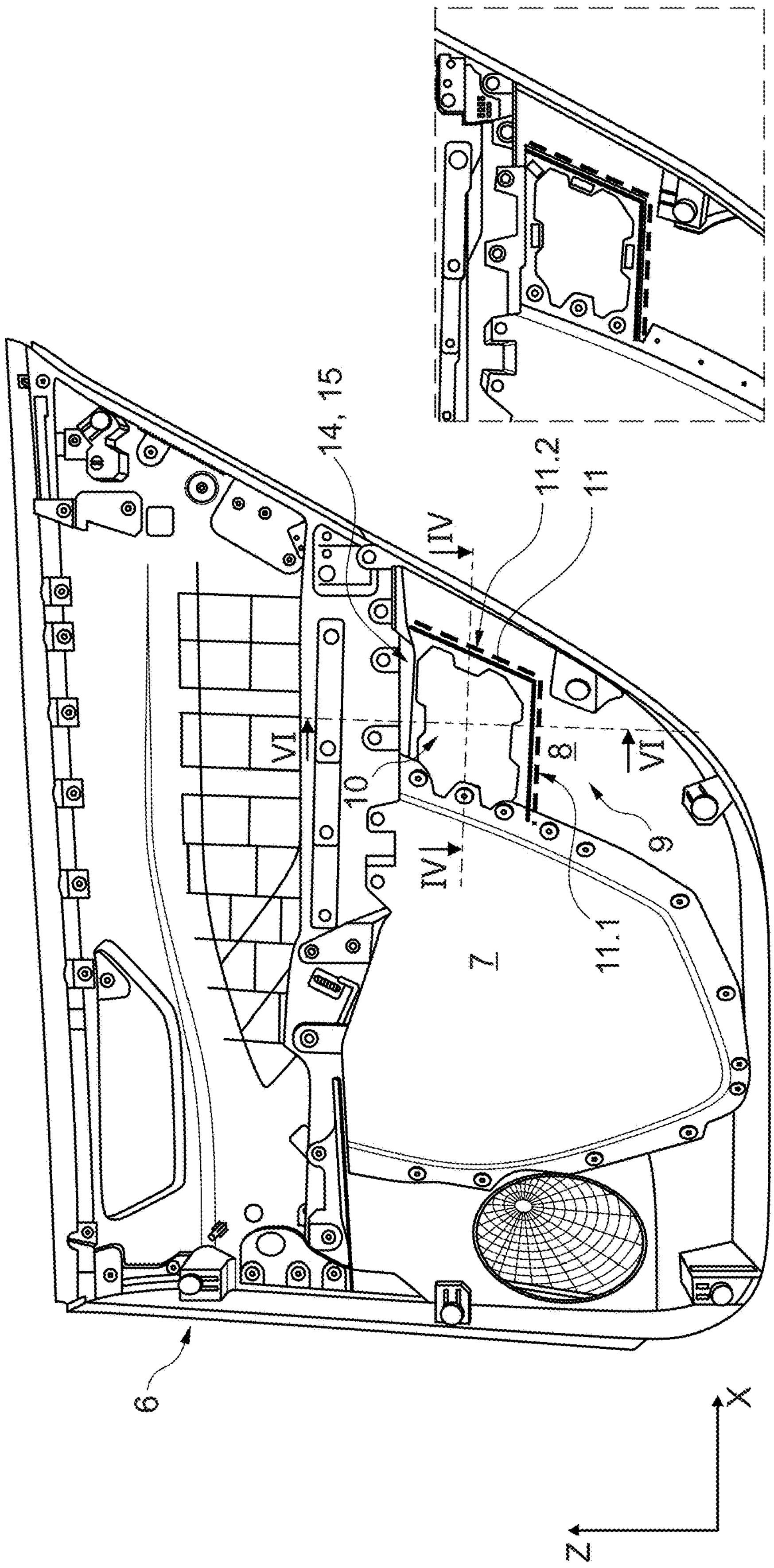
FIG. 3B is a side view of a door trim panel of the door assembly from FIG. 1.
Figure 3C:
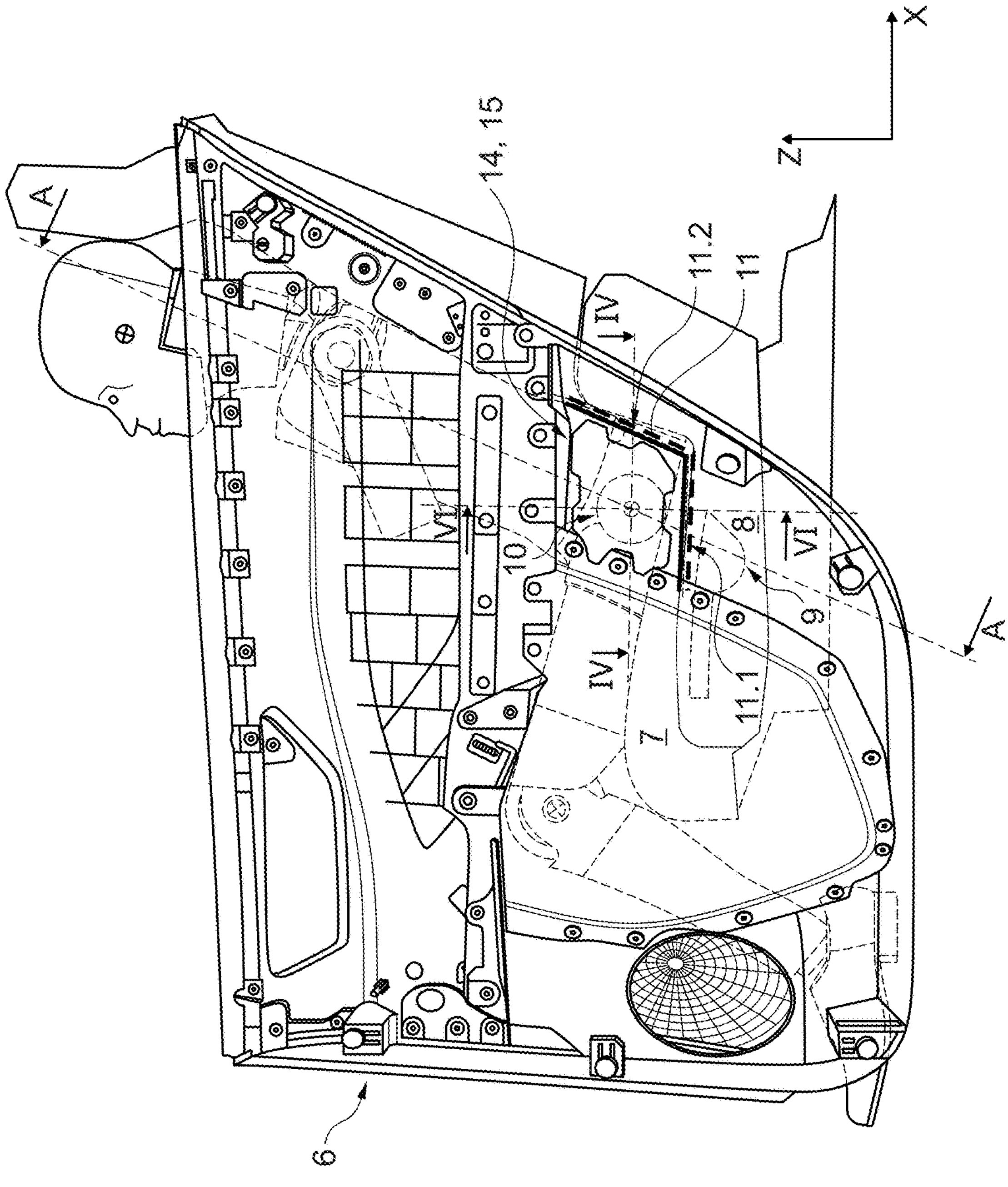
FIG. 3C is a side view of the vehicle seat and door trim panel shown in FIGS. 3A and 3B.

FIGS. 1 and 2 show a depiction along the occupant's center line A-A which runs through the pelvic region concerned. FIG. 2 shows a typical situation during a side impact in which another motor vehicle 30 (or a barrier) hits the vehicle door 1 from the side and deforms this in the direction of the vehicle seat 22 with the occupant 25. During a side impact, the seat impact region 9 may collide with the above-mentioned hard parts of the vehicle seat 22 before the pelvic impact region 10 collides with the pelvic region 26. In other words, compression within the seat impact region 9 begins before the pelvic impact region 10 comes into any contact with the occupant 25. To prevent the precompression from propagating decisively to the pelvic impact region 10, a nominal break line 11 is formed between the seat impact region 9 and the pelvic impact region 10, the course of which line is shown in FIGS. 3A, 3B and 3C. FIG. 3A shows the vehicle seat 22 with occupant 25 (dummy) seated thereon, wherein the nominal break line 11 is indicated so as to depict as an example the relationship between the seat position, pelvic region and seat impact region. FIG. 3B shows exclusively the door trim panel 6 with nominal break line 11 in a view towards the outside with respect to the proposed installation position within the vehicle. FIG. 3C is a combined view of FIGS. 3A and 3B, wherein line A-A is also evident.

Amongst others, the door trim panel 6 has a first trim element 7 and a second trim element 8, as can be best seen in FIGS. 3B. The two trim elements 7, 8 may be made of plastic and each have a structure which could be described as thin-walled and shell-like. The nominal break line 11 is formed inside the second trim element 8 and can be roughly divided into a lower portion 11.1 and a rear portion 11.2. The lower portion 11.1 runs towards the rear along the X-axis, wherein it slopes slightly downward. This course corresponds approximately to the upper contour of the seat surface of the vehicle seat 22. The rear portion 11.2 adjoins the lower portion 11.1 and is angled relative thereto, such that it runs obliquely upward and its course corresponds approximately to the front contour of the backrest of the vehicle seat 22.

Figure 6:
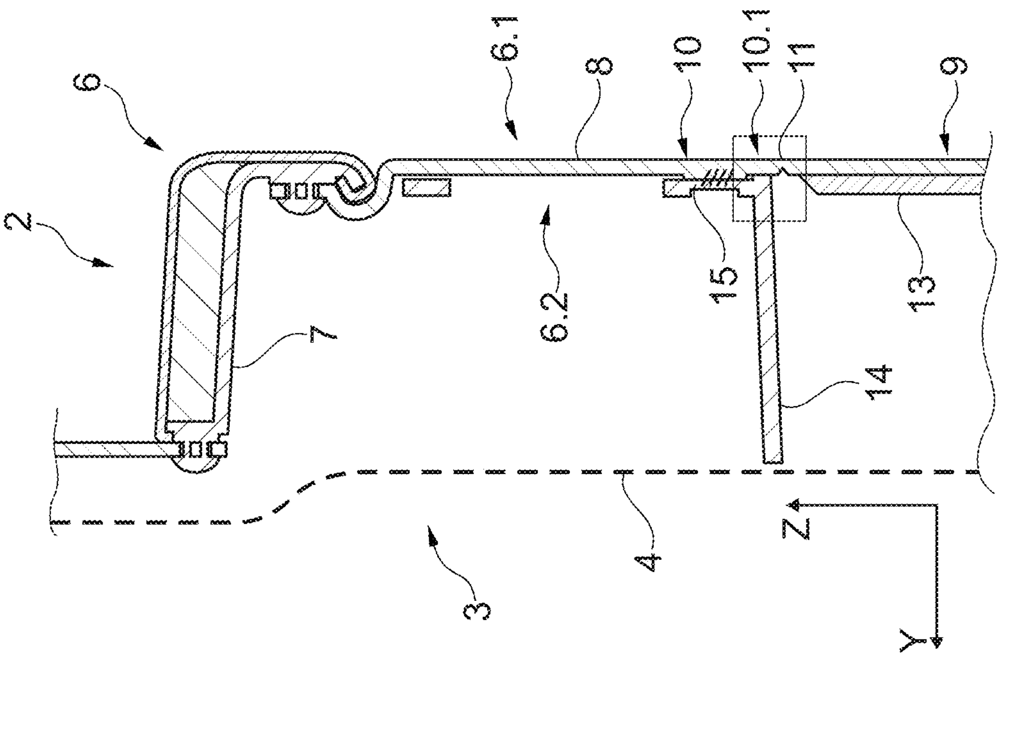
FIG. 6 is a cross-sectional illustration taken along line VI-VI of FIGS. 3A-3C.

The function of the nominal break line 11 is to allow a separation of the seat impact region 9 from the pelvic impact region 10 when a force F acts on the seat impact region 9 in the vehicle transverse direction (i.e., along the Y-axis). The nominal break line 11 constitutes a linear weakening structure. Along the nominal break line 11, a first groove 12 is formed on the B-side 6.2 of the door trim panel 6 facing the door body 3, whereby the material of the second trim element 8 is thinned and hence weakened. This is evident for example in the sectional depictions of FIGS. 4 and 6. In order to support the separation of the seat impact region 9, a series of rib elements 13 is formed on the seat impact region 9 on the B-side 6.2, which protrude in the vehicle transverse direction and run to (e.g., at right angles to) the nominal break line 11. These rib elements 13 stabilize the seat impact region 9, and any forces acting at an arbitrary point are transferred into the region of the nominal break line 11.

The pelvic impact region 10 in turn may be supported by a rib-like or plate-like support element 14 in an edge region 10.1 adjacent to the nominal break line 11. The support element 14 extends through the intermediate space between the second trim element 8 in the direction of the inner plate 4, wherein in this example, its extent in the vehicle transverse direction corresponds to around 90% of the extent of the intermediate space, so that in an undeformed state of the door assembly 2, it is still spaced from the inner panel 4. Even a slight deformation of the second trim element 8 is sufficient for the support element 14 to come into contact with the inner plate 4, and hence be able to transmit a force F' between the inner plate 4 (and hence the door body 3) and the edge region 10.1 (see also FIGS. 7A, 7B, 8A and 8B).

In the example shown, the support element 14 is connected to the pelvic impact region 10 not directly but via a contact element 15 formed integrally therewith, which is angled in relation to support element 14 and hence bears superficially on the pelvic impact region 10. The connection between the contact element 15 and the pelvic impact region 10 may be created for example by material fit by use of bonding or welding. The support element 14 and the contact element 15 are formed integrally with the first trim element 7 for production reasons, as also indicated in FIGS. 3A-3C. Alternatively, it would also be possible, although more complicated, for the support element 14 to be molded directly onto the pelvic impact region 10.

If a force F acts on the seat impact region 9 in the direction of the door body 3, this is also transmitted via the region of the nominal break line 11 to the pelvic impact region 10, where it is compensated by a counter force F' from the door body 3 transmitted by the support element 14. Thus a stress occurs which is concentrated in the region of the nominal break line 11. This, together with the material weakening there, leads to the intended tearing or breaking away of the seat impact region 9, as illustrated in FIG. 2 and FIGS. 7B and 8B.

Figures 4, 5A, 5B, 5C, 5D, 5E, 5F:
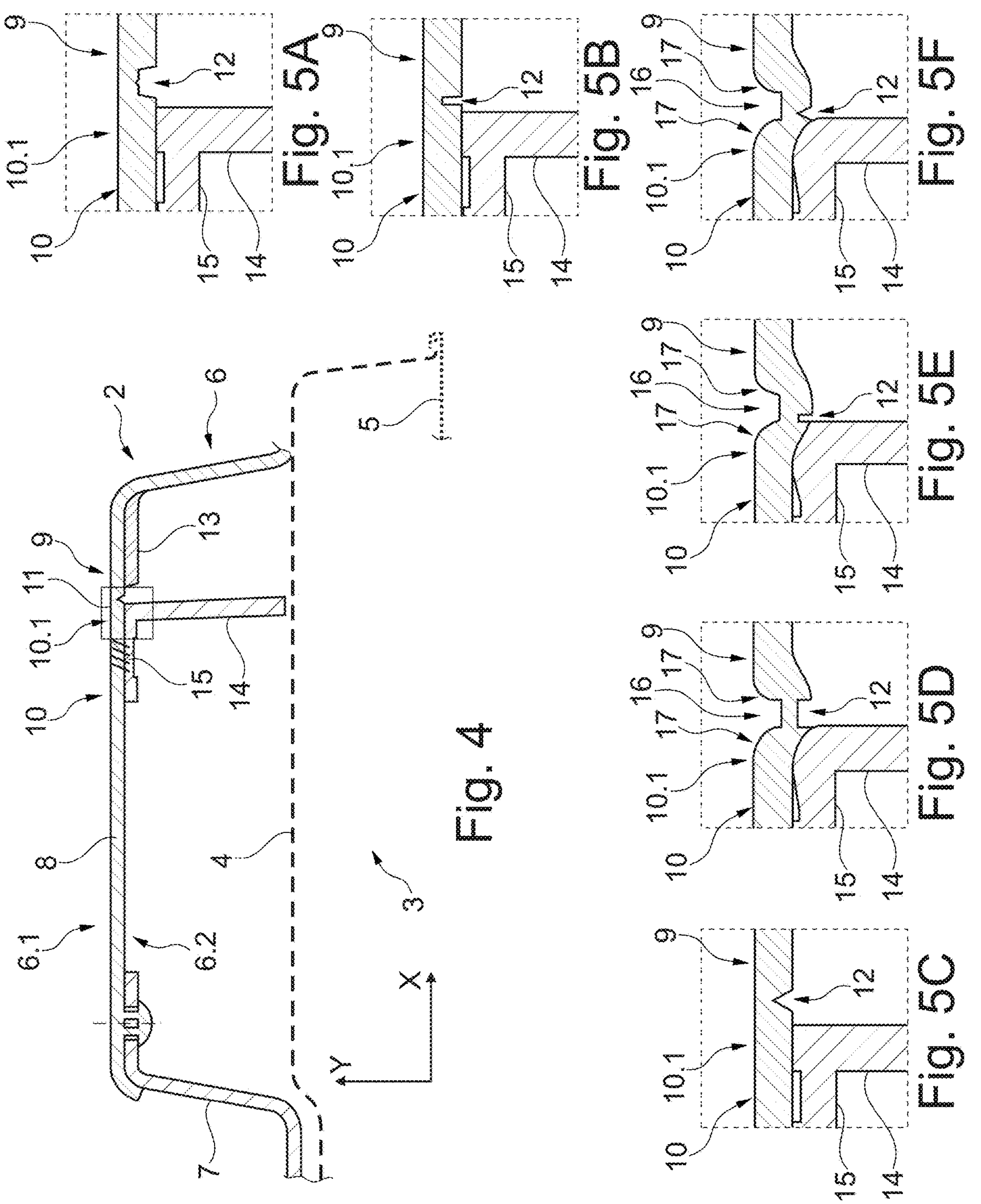
FIG. 4 is a cross-sectional illustration along line IV-IV of FIGS. 3A-3C.
FIG. 5A is a detailed depiction of an enlarged section of FIG. 4, according to a first embodiment.
FIG. 5B is a detailed depiction of an enlarged section of FIG. 4, according to a second embodiment.
FIG. 5C is a detailed depiction of an enlarged section of FIG. 4, according to a third embodiment.
FIG. 5D is a detailed depiction of an enlarged section of FIG. 4, according to a fourth embodiment.
FIG. 5E is a detailed depiction of an enlarged section of FIG. 4, according to a fifth embodiment.
FIG. 5F is a detailed depiction of an enlarged section of FIG. 4, according to a sixth embodiment.

With respect to production of the first groove 12, various possibilities exist which are indicated in the enlarged detail views of FIGS. 5A-5C. The first groove 12 may be punched or embossed, for example, as indicated in FIG. 5A by the comparatively wide, trapezoid cross section. Alternatively, the first groove 12 may be cut mechanically or by use of a laser, as indicated by the narrow rectangular cross section in FIG. 5B. Finally, the groove 12 may also be provided during the forming process, as indicated by the wedge-shaped cross section in FIG. 5C. Each of the possibilities shown may be combined with a second groove 16 on the A-side 6.1 facing the vehicle interior. On both sides of the second groove 16, the second trim element 8 has a rounded profile 17. In this configuration, any sharp break edges 18 occurring at the nominal break line 11 are moved back in the direction of the door body 3, so that only the rounded profile 17 faces the vehicle interior and hence the occupant 25. This reduces the risk of excessive impact to the occupant 25. Corresponding embodiments are illustrated in FIGS. 5D-5F. As evident from the illustration in FIG. 3B, the support element 14 extends along the entire nominal break line 11. Alternatively, another support element 14, distinct from that in the region of the rear portion 11.2, could be arranged in the region of the lower portion 11.1.

Figure 7B:
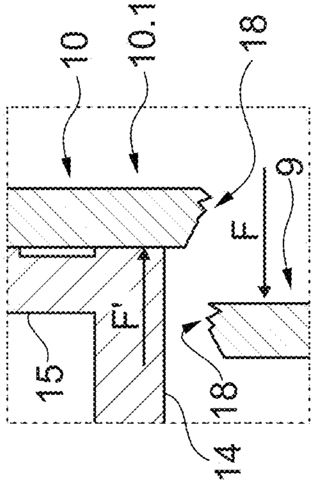
FIG. 7B is a detailed depiction of an enlarged section of FIG. 6 illustrating the separation of the first impact region as a seat impact region, from the second impact region as a pelvic impact region, according to the first embodiment.
Figure 7A:
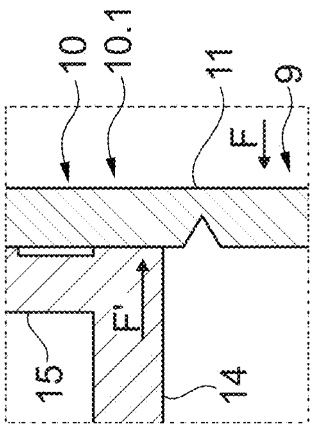
FIG. 7A is a detailed depiction of an enlarged section of FIG. 6 illustrating a first impact region as a seat impact region, connected to a second impact region as a pelvic impact region, according to a first embodiment.
Figure 8B:
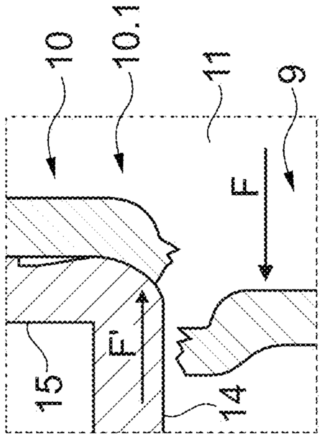
FIG. 8B is a detailed depiction of an enlarged section of the separation of the first impact region as a seat impact region, from the second impact region as a pelvic impact region, according to the second embodiment.
Figure 8A:
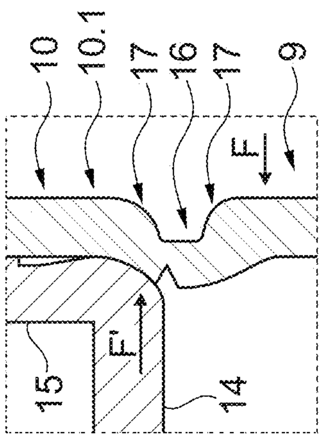
FIG. 8A is a detailed depiction of an enlarged section of a first impact region as a seat impact region connected to a second impact region as a pelvic impact region, according to a second embodiment.

FIG. 7A corresponds largely to FIG. 5C and shows the force F acting on the seat impact region 9 in a side impact, and the counteracting force F' from the support element 14, both of which act in the region of the nominal break line 11 and finally lead to a tearing or breaking away, as illustrated in FIG. 7B. However, break edges 18 thereby occur, which could under certain circumstances constitute a risk of excessive impact to the occupant 25. FIG. 8A corresponds substantially to FIG. 5F, including the second groove 16 and its rounded profile 17. If the seat impact region 9 breaks away here, break edges 18 also occur which are not directly facing the occupant 25 but effectively screened behind the rounded profile 17.

It should be noted that the features and measures specified individually in the description can be combined with one another in any desired technically meaningful way and disclose further refinements of the door assembly. The description additionally characterizes and specifies the door assembly, in particular in conjunction with the figures.

The disclosure provides a door assembly for a motor vehicle. The motor vehicle may in particular be a car or a truck, for example. The door assembly is assigned to a vehicle door which closes the interior of the motor vehicle against the outside. In particular, the disclosure discloses a targeted division and separation of a motor vehicle door trim panel in order to optimize the energy management in a side impact.

On the vehicle inside, the door assembly has a door trim panel attached to a door body. In this context, the term "door body" is used as a general term for the door carcass, which may include the inner panel and outer panel, and any provided door module. Such a door module is arranged on the inside of the inner panel, and serves for example to cover openings in the inner panel and hold function elements such as electric window lifters, speakers, locking elements, etc. The inner and outer panels usually include of metal, although in this context the term "panel" should not be interpreted restrictively and a design made of fiber-composite material would also be conceivable. In contrast, the door module is normally made of plastic, in some cases also fiber-reinforced plastic. The door trim panel is attached to the door body on the vehicle inside, which is the side facing the vehicle interior when the door is closed. It may in particular be attached to the inner panel or door module. The door trim panel usually includes plastic. It may also have a surface coating creating a pleasing appearance and feel. This surface coating may include, for example leather, synthetic leather or fabric. The door trim panel may be made of one or more parts and may comprise of several trim elements. The type of fixing is not restricted in the context of the disclosure, wherein here normally releasable connecting devices may be used such as clips, such as clamps, snap connectors or screws.

The door trim panel has a first impact region, which could also be called a seat impact region and, for example, lies opposite a vehicle seat in the vehicle transverse direction, and a second impact region formed integrally therewith which lies, for example, opposite a pelvic region of an occupant and may be described as the pelvic impact region. These statements evidently relate to the operating state of the vehicle in which the door and vehicle seat are correctly installed, and with an occupant sitting on the vehicle seat. Here, a region of the door trim panel, designated the seat impact region, lies opposite the vehicle seat in the vehicle transverse direction (i.e., along the Y-axis). Directional data such as "in the vehicle transverse direction" with respect to the door assembly relate to the correctly installed and closed vehicle door. In particular, the seat impact region may lie opposite a frame of a seat lower part or seat backrest, or an adjustment element arranged on the side of the vehicle seat. If, in a side impact, the door is pushed inward in the vehicle transverse direction, the seat impact region may collide with the vehicle seat. Another region, designated the pelvic impact region, lies opposite the occupant's pelvic region in the vehicle transverse direction. In a side impact therefore, this region may collide with the occupant's pelvic region. The seat impact region is formed integrally or as one piece with the pelvic impact region, i.e., insofar as the door trim panel is composed of several trim elements, the seat impact region and pelvic impact region are parts of one and the same trim element. The vehicle seat may be the driver's seat, the front passenger's seat or a rear seat or rear bench seat. Accordingly, the vehicle door may be the driver's door, the front passenger's door or one of the rear doors. Naturally, the respective terms "seat impact region" and "pelvic impact region" used in the following description are not restrictive. In principle, the door assembly is configured to protect occupants over the entire body region.

At each of the impact regions, an intermediate space is formed between the door trim panel and the door body. In other words, the door trim panel does not rest (completely) on the door body with the impact regions, but is spaced therefrom at least in regions. Thus, an intermediate space is formed between the door trim panel and the door body in the vehicle transverse direction. This naturally refers to the undamaged and undeformed state of the door. Preferably, the intermediate space is formed as a cavity, such that it is at least largely empty or air-filled, although it is possible that various elements, such as cables for components attached to the door module, are arranged at least partially inside the intermediate space. Because of the distance or intermediate space, each of the impact regions may in principle serve as a crumple element or energy-absorbing element. A particularly important function of the pelvic impact region which collides with the occupant is that, by suitable deformation, it can decisively contribute to limiting the maximum force that may act on the occupant. In other words, it can yield on collision with the occupant. In contrast, the door inner panel is typically so stable that it may not yield significantly and may behave as a solid rigid body against the occupant's body.

According to the disclosure, a nominal break line is formed between the impact regions, i.e., the exemplary seat impact region and the exemplary pelvic impact region, along which line the seat impact region can be separated from the pelvic impact region by a force acting in the vehicle transverse direction. One could say that the nominal break line separates the seat impact region from the pelvic impact region at least in regions or forms the boundary between the two impact regions. The contour and position of the vehicle seat are decisive for the division of the door trim panel into the seat impact region and pelvic impact region, and thus determine the course of the nominal break line. On an overlap of the vehicle seat and door trim panel, typically an L-shaped course of the nominal break line may result, or for example a horizontal course if the backrest of the vehicle seat is situated outside or behind the door region. The nominal break line is formed as a linear weakening structure inside the door trim panel. Usually, the weakening is based on removal of material or omission of material in comparison with the adjacent regions. Normally, the material of the door trim panel is thinned along the nominal break line, such as by at least one groove or notch. The door assembly thus, for example, obviates the need to form the nominal break line from another material which is mechanically weaker than in the adjacent regions, which would be very complex with respect to production. The corresponding weakening need not lie along the entire nominal break line. For example, a plurality of successive grooves could be formed along the nominal break line, forming a pattern similar to a dotted line.

The presence of the nominal break line means that the seat impact region can be separated from the pelvic impact region if a force acts on the seat impact region in the vehicle transverse direction. The latter is the case in a side impact, in particular if the seat impact region collides with the seat before contact is made between the pelvic impact region and the occupant's pelvic region. In this case, the seat impact region can break or tear away from the pelvic impact region along the nominal break line, which in turn means that it can largely be deformed separately from the pelvic impact region. If firstly a collision occurs with the vehicle seat, the seat impact region may already be deformed without necessarily leading to a significant compression at the pelvic impact region. If the pelvic impact region then collides with the occupant's pelvic region, it is still largely undeformed and forms a comparatively flexible contact face for the pelvic region. The maximum forces acting on the pelvic region may thus be limited and the risk of excessive impact to the occupant reduced.

In many cases, the proposed tearing or breaking away of the seat impact region may be supported by supplementary measures. According to a corresponding embodiment, at least one support element extends in the vehicle transverse direction between an edge region of the pelvic impact region formed adjacent to the nominal break line and the door body, wherein an extent of the support element in the vehicle transverse direction corresponds to at least 70% of an extent of the intermediate space. The at least one support element extends in the vehicle transverse direction, i.e., the direction in which the door trim panel is spaced from the door body. It extends between an edge region of the pelvic impact region adjacent to the nominal break line, and the door body. The edge region is preferably formed particularly close to the nominal break line, such as less than 1 cm or less than 5 mm away from the nominal break line. The support element extends between the edge region and the door body, wherein it need not however necessarily be in contact with the edge region or the door body in the undamaged state of the door assembly. However, its extent in the vehicle transverse direction is at least 70% of an extent of the intermediate space or a distance between the edge region and the door body. The corresponding extent may preferably correspond also to at least 80% or at least 90% of the extent of the intermediate space. The support element is configured to support the edge region (and hence the pelvic impact region) against the door body in the vehicle transverse direction. Insofar as the support element does not extend completely from the edge region to the door body in the undamaged state of the door, the corresponding support is provided after a degree of deformation of the pelvic impact region. If for example the extent of the support element corresponds to 70% of the distance, the pelvic impact region may be moved by 30% of the distance in the direction of the door body (or conversely) before the support element comes into contact on both sides and provides a corresponding support. As soon as this is the case, the support element counters a deformation of the pelvic impact region and generates a counterforce to a force acting from the seat impact region. Therefore a force pair is created which supports the tearing or breaking away of the seat impact region along the nominal break line. In total, a plurality of support elements may be provided.

To save material and to achieve good structural stability of the support element, at least one support element may be formed as a rib. The support element is rib-like, such that its shape approximates to a two-dimensional flat shape. It extends firstly in the vehicle transverse direction, but not necessarily parallel thereto. In order to be able to optimally absorb the forces acting in the vehicle transverse direction, the support element may extend at an angle of less than 30°, less than 20° or less than 10° to the vehicle transverse direction. The support element may extend in a course direction which may generally differ locally. Corresponding to the rib form, a dimension of the support element transversely to the course direction is substantially smaller than in the course direction.

At least one support element at least in portions may follow the course of the nominal break line. In other words, the course direction of the support element is oriented at least in portions to the course of the nominal break line. It may run precisely parallel to the nominal break line or deviate therefrom in parts.

According to one embodiment, the at least one support element is at least indirectly attached to the pelvic impact region. In other words, it may be attached directly to the pelvic impact region or indirectly via a further intermediate element. The fixing may take place by form fit, force fit and/or material fit. Under certain circumstances, the support element may also be formed integrally with the pelvic impact region, such as molded directly onto the pelvic impact region for example on forming of the door trim panel. Depending on the geometric design and arrangement of the support element, however, this may complicate the production process, in which case separate production and subsequent attachment may be preferred. Under certain circumstances, the support element may be part of a first trim element while the pelvic impact region and seat impact region are part of a second trim element which may be connected to the first trim element. The fixing of the support element is normally arranged close to the above-mentioned edge region but not necessarily directly at the edge region. However, it is preferred that part of the support element is arranged directly adjacent to the edge region or even contacts this. In this way, an optimal force flow may be ensured between the edge region and the support element.

As outlined above, in some cases a separate production of the support element on one side and the pelvic impact region on the other is advantageous. In order to guarantee a secure fixing of the support element in this case, in particular if this is formed as a rib as described above, advantageously at least one support element may be formed integrally with a contact element which bears superficially on the pelvic impact region and is attached thereto. Normally, the contact element is angled relative to the support element. The contact element rests superficially on the pelvic impact region, and may at least approximately run parallel thereto, while the support element may run at least approximately in the vehicle transverse direction, whereby usually a relatively large angle is created between the course of the contact element on one side and the course of the support element on the other (e.g., between 70° and 90°). In cross section, the support element and the contact element together may form an L-shaped profile. The contact element for its part may for example be bonded or welded to the pelvic impact region (e.g., by ultrasound welding), wherein other fixing methods are also conceivable.

Even if the support element is attached to the pelvic impact region and in contact therewith, there are various possibilities with respect to the physical relationship between the support element and the door body. Thus, at least one support element may be spaced from the door body in the vehicle transverse direction. In other words, the extent of the support element corresponds to less than 100% of the distance between the pelvic impact region and the door body. If the pelvic impact region is deformed, the support element may come into contact with the door body and ensures the support described above. It is also possible that at least one support element contacts the door body, wherein effectively it rests loosely on the door body. Finally, it is possible that at least one support element is pretensioned against the door body. In other words, the support element transmits a force in the vehicle transverse direction between the pelvic impact region and the door body even when the door assembly is in the undamaged state. Under certain circumstances, this may support premature separation of the seat impact region from the pelvic impact region.

The controlled separation of the seat impact region from the pelvic impact region may be further supported if the pelvic impact region is stiffened in itself. Normally, the door trim panels are made of a comparatively thin-walled material which only has limited stiffness. By structural strengthening, the stiffness of the pelvic impact region can be improved and where applicable stresses can also be concentrated in the region of the nominal break line. According to a corresponding embodiment, at least one rib-like reinforcing element, which extends towards the nominal break line, is formed on the seat impact region on a B-side of the door trim panel facing the door body. The respective reinforcing element is rib-like and protrudes away from the door trim panel towards the door body. It is thus formed on the B-side of the door trim panel facing the door body. In contrast to the above-mentioned rib-like support element, the reinforcing element however does not follow the course of the nominal break line but runs towards the nominal break line (or away from this, depending on observation direction). It thus runs at an angle to the nominal break line, e.g., at an angle between 45° and 90°. The reinforcing element may also serve to transfer the force or stress when the seat impact region is loaded at some distance from the nominal break line, so that this is primarily effective in the region of the nominal break line. It is understood that also a multiplicity of corresponding reinforcing elements may be provided.

The nominal break line may have a lower portion extending towards the rear in the vehicle longitudinal direction, and starting from this, an upwardly extending rear portion. The lower portion delimits the pelvic impact region towards the bottom while the rear portion delimits the pelvic impact region towards the rear. The lower portion runs towards the rear in the vehicle longitudinal direction, wherein however in general it need not run parallel to the vehicle longitudinal axis but may slope with respect to this. The slope may be adapted to a slope of the seat surface or a frame of a seat lower part. The rear portion adjoins the lower portion and runs upward, but normally not parallel to the vertical axis of the vehicle. Usually, the rear portion slopes with respect to the vertical axis, which may for example correspond to the slope of a backrest of the vehicle seat. The transition from the lower portion to the rear portion may be defined more or less clearly, for example giving a curved or angled line course at the transition.

As already described above, the nominal break line constitutes a linear weakening structure within the door trim panel. This may be defined by the omission or removal of material. According to one embodiment, the nominal break line is at least partially defined by at least a first groove which is formed on the B-side of the door trim panel. The groove may be molded in, for example, on forming of the door trim panel. Alternatively, it may, for example, be cut subsequently mechanically or by use of a laser. Various other possibilities are conceivable such as forming of the door trim panel such that the groove is punched or embossed. The cross section of the groove may be rectangular, V-shaped or U-shaped, or otherwise rounded. As well as a single groove, a series of grooves may also be provided along the nominal break line. The length of the individual grooves could also be shortened so far that, instead of a series of grooves, a series of blind holes is provided which start from the B-side.

In general, one could say that, on the B-side, there is at least a first recess which forms at least a first recess along the nominal break line. The respective recess, which could also be described as a blind opening, could be formed as a groove or as a blind hole.

Under certain circumstances, break edges which result on separation of the seat impact region from the pelvic impact region could constitute a risk of impact to the occupant. This risk of impact can be reduced if the profile of the door trim panel is adapted such that the break edges are effectively displaced in the direction of the door body and hence away from the occupant. According to a preferred embodiment, on an A-side of the door trim panel facing the vehicle interior, at least a second groove is formed along the nominal break line, wherein the door trim panel has a rounded profile on both sides of the second groove. The second groove may under certain circumstances be formed wider than the above-mentioned first groove. Its function is not primarily to form the weakening structure of the nominal break line, but to displace the profile locally away from the occupant in the region of the nominal break line. The above-mentioned at least one groove (or more generally, the at least one first recess) lies opposite the second groove in the vehicle transverse direction. The break edges forming in the region of the at least one first groove then are situated effectively on the floor of the second groove, whereby at least direct contact with the occupant is prevented. The occupant rather comes into contact with the portions of the pelvic impact region and in some cases the seat impact region which are formed directly at the side of the second groove. The risk of contact to the occupant is further reduced if the profile on both sides of the second groove is rounded, i.e., rounded convexly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door assembly for a motor vehicle, the door assembly comprising:

a door body; and a door trim panel attached to the door body on a vehicle interior side, the door trim panel having a first impact region and a second impact region formed integrally therewith, wherein at each of the first and second impact regions, an intermediate space is formed between the door trim panel and the door body, wherein a nominal break line is formed between the first impact region and the second impact region, along which the first impact region can be separated from the second impact region by a force acting in a vehicle transverse direction.

2. The door assembly according to claim 1 further comprising at least one support element extending in the vehicle transverse direction between an edge region of the second impact region formed adjacent to the nominal break line and the door body, wherein an extent of the support element in the vehicle transverse direction corresponds to at least 70% of an extent of the intermediate space.

3. The door assembly according to claim 2, wherein the at least one support element is formed as a rib and at least in portions follows a course of the nominal break line.

4. The door assembly according to claim 2, wherein the at least one support element is attached at least indirectly to the second impact region.

5. The door assembly according to claim 2, wherein the at least one support element is formed integrally with a contact element which bears superficially on the second impact region and is attached thereto.

6. The door assembly according to claim 2, wherein at least one support element is spaced from the door body in the vehicle transverse direction, contacts the door body or is pretensioned against the door body.

7. The door assembly according to claim 1 further comprising at least one rib-like reinforcing element which extends towards the nominal break line and is formed on the first impact region on a B-side of the door trim panel facing the door body.

8. The door assembly according to claim 7, wherein the nominal break line has a lower portion extending towards a rear in a vehicle longitudinal direction, and an upwardly extending rear portion.

9. The door assembly according to claim 8, wherein the nominal break line is at least partially defined by at least a first groove which is formed on the B-side of the door trim panel.

10. The door assembly according to claim 9, wherein on an A-side of the door trim panel facing a vehicle interior, at least a second groove is formed along the nominal break line, wherein the door trim panel has a rounded profile on both sides of the second groove.

11. A door assembly for a motor vehicle, the door assembly comprising:

a door body;

a door trim panel attached to the door body on a vehicle interior side, the door trim panel having a first impact region and a second impact region formed integrally therewith, wherein at each of the first and second impact regions, an intermediate space is formed between the door trim panel and the door body, wherein a nominal break line is formed between the first impact region and the second impact region, along which the first impact region can be separated from the second impact region by a force acting in a transverse direction; and at least one support element extending in the transverse direction between an edge region of the second impact region formed adjacent to the nominal break line and the door body, wherein an extent of the support element in the vehicle transverse direction corresponds to at least 70% of an extent of the intermediate space.

12. The door assembly according to claim 11, wherein the at least one support element is formed as a rib and at least in portions follows a course of the nominal break line.

13. The door assembly according to claim 11, wherein the at least one support element is attached at least indirectly to the second impact region.

14. The door assembly according to claim 11, wherein the at least one support element is formed integrally with a contact element which bears superficially on the second impact region and is attached thereto.

15. The door assembly according to claim 11, wherein at least one support element is spaced from the door body in the vehicle transverse direction, contacts the door body or is pretensioned against the door body.

16. The door assembly according to claim 11 further comprising at least one rib-like reinforcing element which extends towards the nominal break line and is formed on the first impact region on a B-side of the door trim panel facing the door body.

17. The door assembly according to claim 16, wherein the nominal break line has a lower portion extending towards a rear in a longitudinal direction, and an upwardly extending rear portion.

18. The door assembly according to claim 17, wherein the nominal break line is at least partially defined by at least a first groove which is formed on the B-side of the door trim panel.

19. The door assembly according to claim 18, wherein on an A-side of the door trim panel facing a vehicle interior, at least a second groove is formed along the nominal break line, wherein the door trim panel has a rounded profile on both sides of the second groove.

* * * * *